Nov. 11, 1924.
W. H. MARCUSSEN
1,515,398
GAUGE FOR MEASURING CREAM IN MILK BOTTLES
Filed Aug. 26, 1922
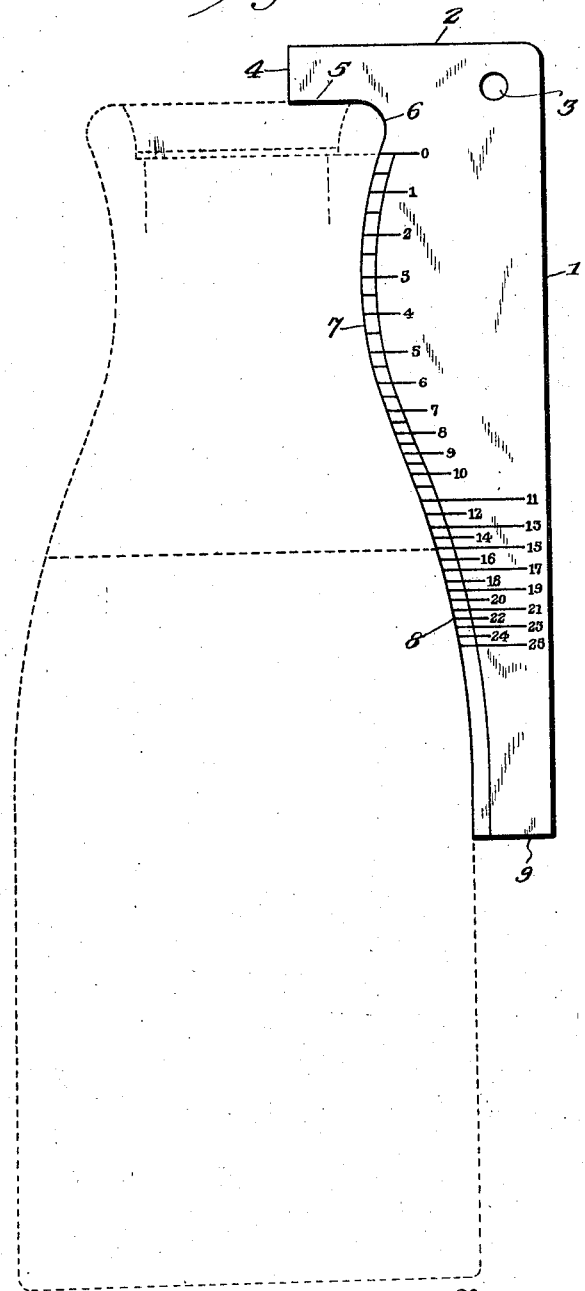
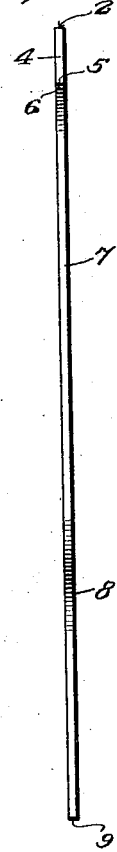
Inventor
William H. Marcussen
By M. M. Cady
Attorney Patented Nov. 11, 1924.

1,515,398

UNITED STATES PATENT OFFICE.

WILLIAM H. MARCUSSEN, OF BROOKLYN, NEW YORK.

GAUGE FOR MEASURING CREAM IN MILK BOTTLES.

Application filed August 26, 1922. Serial No. 584,511.

*To all whom it may concern:*

Be it known that I, WILLIAM H. MARCUSSEN, a citizen of the United States, residing at Brooklyn, in the county of Kings and State of New York, have invented certain new and useful Improvements in Gauges for Measuring Cream in Milk Bottles, of which the following is a specification.

The primary object of this invention is to provide an instrument or gauge for use in measuring the percentage volume of cream in milk held within a transparent container, such as the commonly used milk bottle, by applying the instrument or gauge directly to the exterior of the bottle with the zero mark of the scale coinciding with the uppermost level of the milk so that by examining the point on the scale at which the line of demarcation between the cream layer and the skim milk layer occurs, one can tell in terms of percentage the cream volume of the total volume of milk in the transparent container.

The amount of cream present on a bottle of milk adds to the attractiveness of the product. It is used by a customer as an indication of richness and high food value. A large cream volume enhances the value of the product. Faulty pasteurization, excessive handling, violent shaking and the like, while they may not affect the food value of the milk or decrease the amount of butterfat present, do prevent the fat globules from rising to the upper surface of the milk and thereby decreasing the apparent amount of cream present in milk in glass containers. The cream volume gauge of this invention will provide a means for measuring in terms of "percentage of cream volume" the amount of cream present in the container without removing the milk from the commercial containers.

With the above and other objects in view, as will be hereinafter more fully pointed out as the description proceeds, reference will be had to the accompanying drawing forming a part of this specification and wherein like numerals of reference designate corresponding parts throughout the several views, in which:—

Fig. 1 is a view in side elevation of the gauge shown applied to a milk bottle, which latter is diagrammatically illustrated in dotted lines, and Fig. 2 is an edge view of the gauge.

Referring to the drawing, reference numeral 1 indicates the rear edge and 2 the top edge of the gauge, these being substantially at right angles to each other, and the body of the gauge adjacent the corner so formed is provided with a suspending opening 3. The front edge of the gauge comprises portion 4 substantially at right angles to the edge 2 and parallel with the edge 1, and this portion 4 terminates in right angular portion 5, which is substantially parallel with the edge 2 and merges in or terminates in a rounded shoulder portion 6, which merges in a convex portion 7 which in turn merges in a concave portion 8 that terminates with the bottom edge 9, the latter being substantially at right angles to the edge 1. At the proper distance from the plane of the edge portion 5, the scale markings with which the edge portions 7 and 8 are provided begin with a zero mark. From such initial mark downwardly, the scale is divided into full and half units for a portion of the distance and then with only whole units markings for the remainder of the distance, and these whole units markings are indicated by ordinals reading consecutively downwardly as from zero to the ordinal 25, which range sufficiently serves for any grade of commercial milk that might be found upon the market.

The configuration of the edge portions 5, 6, 7 and 8 is given so that the gauge will fit conformingly to the commercial glass milk bottle, with the portion 5 resting on the upper edge of the bottle, the portion 6 fitting the neck bead, the portion 7 fitting the restricted neck portion, and the portion 8 fitting the bilge of the bottle, and when so placed, the zero mark on the scale will coincide with the uppermost level of the milk. These containers are of regulation measure and contain the stated measure only when filled to the plane of the paper closure disk, the bottom of which and the uppermost level of the milk will coincide with the zero mark and make shifting of the gauge unnecessary to bring the zero mark adjacent the uppermost milk level.

Thus it will be seen that by reading downwardly on the scale, to the point where the cream and skim milk form a line of separation, one can determine at a glance the percentage of cream contained within the milk if the milk has been given sufficient time to settle, and if a proper cream content does not show up, then there is an indication that the milk is either of insufficient richness or has been improperly handled and disturbed to such an extent that it is equally undesirable to a purchaser as if it were of a low cream richness.

What is claimed as new and useful and desired to be secured by Letters Patent is:—

1. A cream gauge comprising a thin piece of material having one edge provided with a shoulder and also shaped to conform to the contour of the side of a standard transparent milk bottle, and further having a scale divided to indicate percentages by measure of the cream volume of the total volume of milk contents of the bottle, said scale extending downwardly from an initial or zero indication which bears such a relation to the said shoulder that when the shoulder is engaged with a given part of the bottle, the said indication will be coincident with the uppermost level of the milk within the bottle, the indications on the scale being spaced apart varying distances to accord with the varying diameter of adjacent sections of the bottle.

2. A cream gauge adapted to be placed along side a standard delivery transparent milk bottle to indicate by measure the percentage of cream contained in the milk in the bottle, said gauge being formed of sheet material having one side edge thereof for a portion of its length reversely curved for contact throughout said curved portion with the outer side wall of said delivery bottle and gauge indications on said sheet material adjacent the curved edge thereof extending downwardly from a zero indication that is coincident with the lower face of the usual closure disc and full measure level of the bottle.

3. The construction called for in claim 2 characterized by the provision of a lateral extension shoulder carried by the upper end of the gauge at the curved side thereof, insuring proper positioning of the gauge with relation to my delivery bottle.

In testimony whereof I affix my signature.

WILLIAM H. MARCUSSEN.